Nov. 14, 1961   A. C. ANGELOS   3,008,490
PRESSURE SELECTOR SWITH
Original Filed Feb. 23, 1955   2 Sheets-Sheet 1
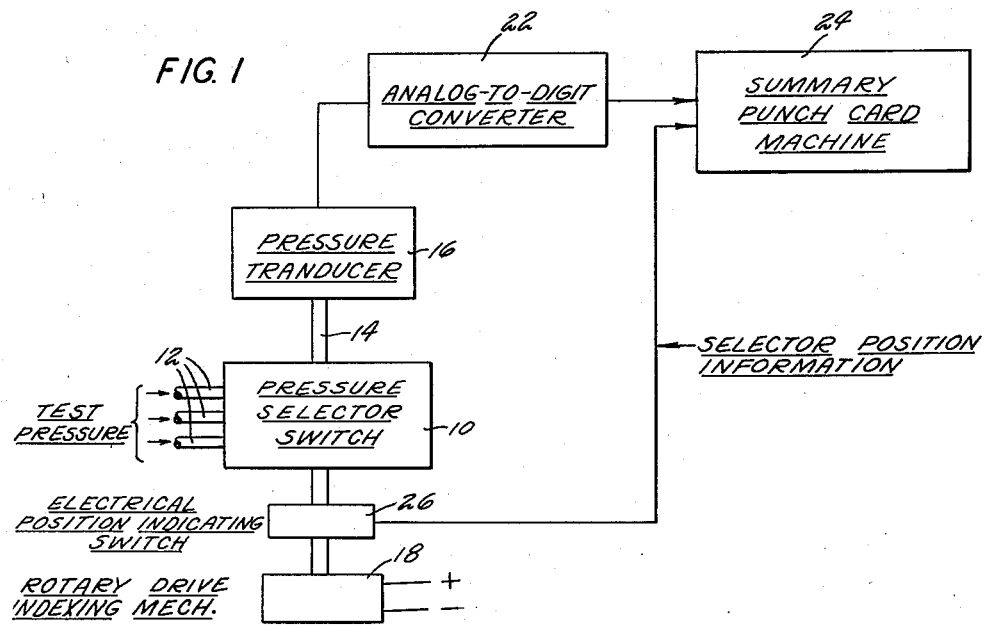
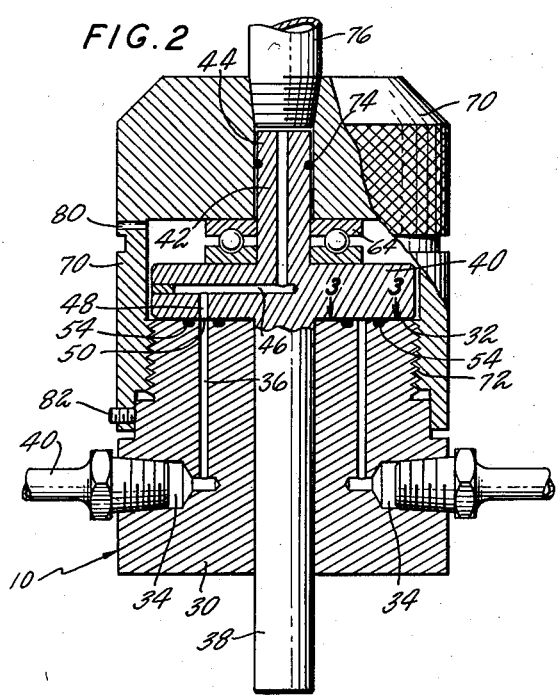
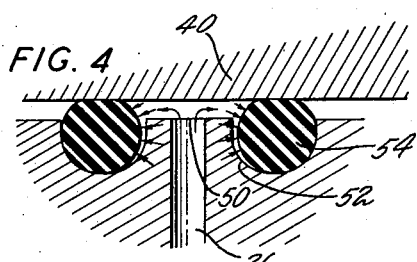
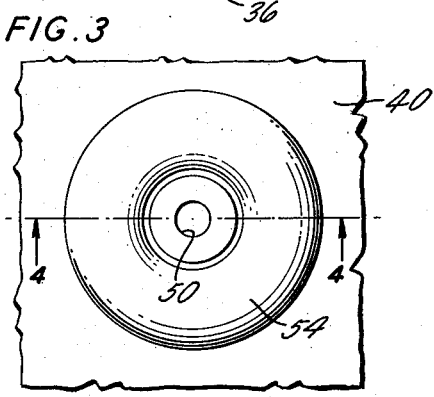
INVENTOR
ARTHUR C. ANGELOS
BY
ATTORNEY

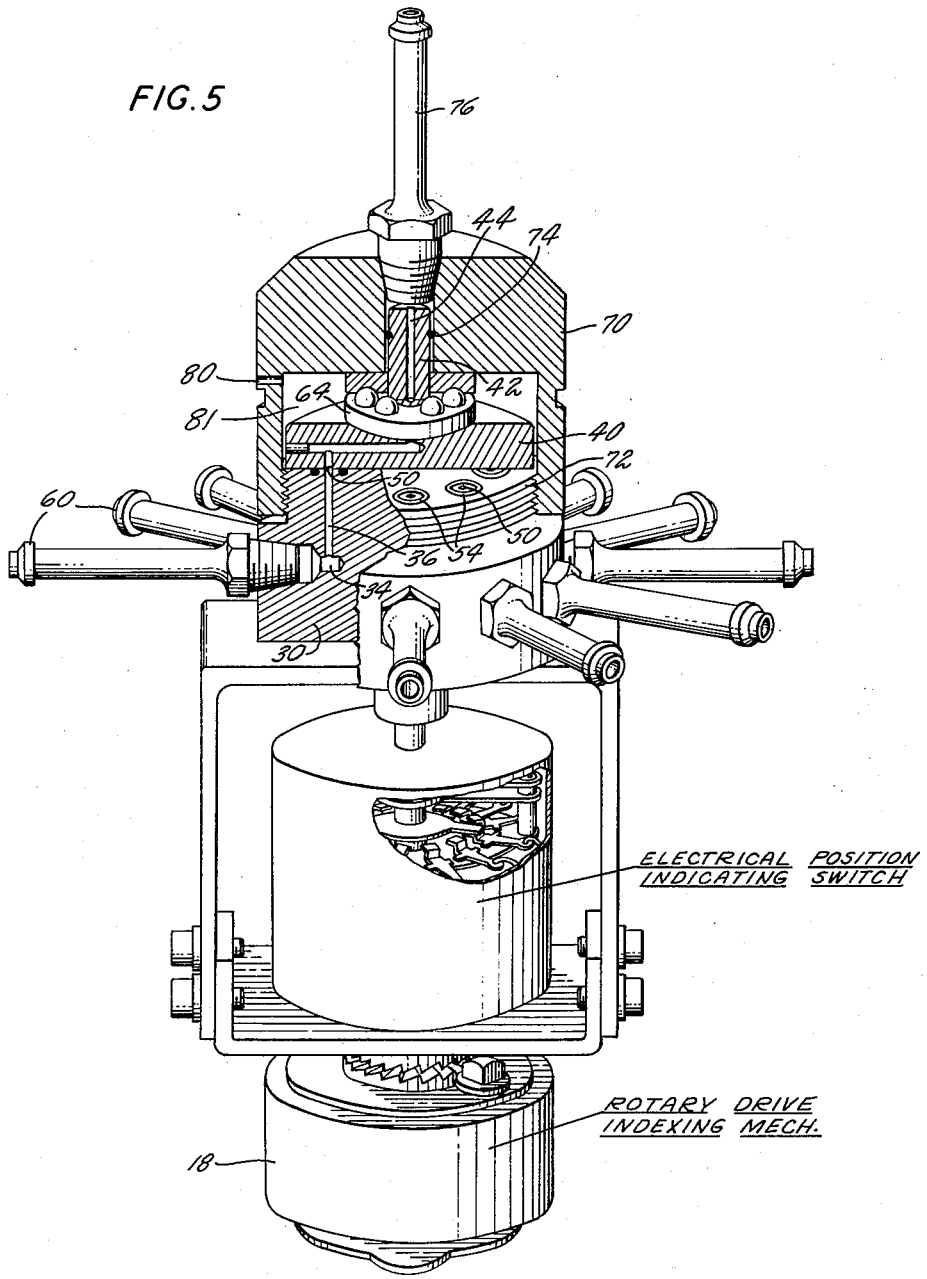

United States Patent Office 3,008,490
Patented Nov. 14, 1961

3,008,490
PRESSURE SELECTOR SWITCH
Arthur C. Angelos, Falls Church, Va., assignor to United Aircraft Corporation, East Hartford, Conn., a corporation of Delaware
Continuation of application Ser. No. 490,041, Feb. 23, 1955. This application Oct. 17, 1958, Ser. No. 767,802
6 Claims. (Cl. 137—625.11)

This invention is a continuation of application Serial No. 490,041 filed February 23, 1955, now abandoned, by Arthur C. Angelos for Pressure Selector Switch and relates to instrumentation and more specifically to pressure or flow selecting mechanisms.

It is an object of this invention to provide a pressure or flow selecting mechanism which is simple yet highly effective.

It is a further object of this invention to provide a pressure selecting mechanism which is capable of handling a plurality of pressures for systematically sensing and/or recording these pressures via a single line and in rapid order while testing conditions remain unchanged.

It is a still further object of this invention to provide a pressure or flow selecting device which can be checked for leakage and the leakage subsequently eliminated.

These and other objects of this invention will become readily apparent from the following detailed description of the drawings in which:

FIG. 1 is a schematic illustration of a pressure sensing and recording system which would include the specific mechanism of this invention;

FIG. 2 is a cross-sectional view of the pressure or flow selector switch;

FIG. 3 is a view taken along the line 3—3 of FIG. 2;

FIG. 4 is a cross-sectional view taken along the line 4—4 of FIG. 3; and

FIG. 5 is a perspective view of the selecting mechanism including the switching and driving elements with a portion broken away for better illustration.

Referring to FIG. 1, a general environment for the particular pressure sensing mechanism of this invention is illustrated. In general, a pressure selector switch 10, more specifically described hereinafter, is provided and has a plurality of pressure lines 12 leading thereto. A single exit line 14 is provided and leads from the pressure selector 10 to a pressure transducer 16. A rotary drive indexing mechanism 18 drives the pressure selector switch so that at successive intervals one of the pressure lines 12 is connected with the line 14. The rotary drive indexing mechanism 18 is a rotary drive assembly or an equivalent thereof, such as "Ledex" type 6SR35-28 manufactured by G. H. Leland, Inc. of Dayton, Ohio. The indexing mechanism includes a ratchet device 19 which will rotate the device in exact increments in a given direction. The pressure transducer 16 converts the particular pressure signal to an electric impulse and may be of the strain gage type or the equivalent thereof such as a "Statham" unit Model P6 manufactured by Statham Laboratories, Inc. of Los Angeles, California. If it is not desired to convert the pressure signal to an electric signal or impulse, the pressure transducer 16 may be replaced by a precision monometer for direct reading. Where the various pressure readings are intended to be recorded, the signal from the transducer for each particular reading is transmitted to an analogue to digit converter 22 which may be of the type designated as a "Sadic" unit manufactured by the Consolidated Engineering Corporation of Pasadena, California. The converter 22 may then send this information to a card punch machine 24 where this information is recorded on individual punch cards. The punch card machine may be of the "Type 517" produced by the International Business Machines Corporation of New York, N.Y. As individual recorded pressures are punched on a given card an electric position switch 26 located adjacent the pressure selector switch will also record on the particular card the selector switch position information. In other words, when the pressure is recorded, the card will also have indicated thereon the particular one of the several lines 12 which is being sensed.

Where a number of pressures are being sensed in consecutive order it is highly important that the particular pressure selector switch be free of leakage and should any leakage occur, that it be readily detectable. The pressure selector switch of this invention has all of these qualities inherently built therein. The pressure selector switch 10 is shown in better detail in FIGS. 2 through 5. As seen in FIG. 2 the selector switch comprises a main body 30 having an upper substantially flat face 32. The body 30 contains a plurality of taps 34 which are circumferentially spaced about the outer periphery of the body 30. Each of the taps or ports 34 leads to a vertical passage 36. A main rotary stem 38 passes centrally and vertically through the body 30 and is intended to be rotated by the rotary drive indexing mechanism 18 shown schematically in FIG. 1 and more clearly in FIG. 5. The stem 38 includes a rotor or disc-like member 40 whose lower surface is intended to be in juxtaposed relation with the substantially flat face 32 on the upper part of the main body 30.

The stem 38 has an upper extension 42 which includes an outlet passage 44 which, in turn, communicates with drilled passages 46 and 48 in the disc-like member 40. The passages 44, 46, and 48 are intended to communicate with each of the vertical passages 36 in the various rotary positions of the disc-like member 40. Each of the passages 36 terminates in an upper opening 50 better seen in FIGS. 3 and 4. Each of the openings 50 is surrounded by a circular groove 52 in which is positioned an O ring type of seal 54. As seen in FIG. 4, the O ring 54 is preferably slightly larger than the associated groove 52 such that in its undeformed condition it will tend to press against the outer surface of the groove thereby providing a snug fit.

As better seen in FIG. 5, a plurality of pressure sensing lines 60 can be seen as leading to each of the ports 34. Here again, one of the vertical passages 36 is shown as leading to one of the openings 50, however, it is here that one can better see the arrangement of the openings 50 and the O rings 54. As seen, in both FIGS. 2 and 5, a ball-type thrust bearing 64 engages the upper surface of the disc-like member 40. This thrust bearing is engaged by a cap 70 which is attached to the main body 30 by a thread 72. The cap 70 is sealed with respect to the upper extension 42 by an O ring seal 74. The cap 70 is intended to deform each of the O rings 54 a slight amount and thus to provide a positive seal so that no leakage occurs from one port 50 to an adjacent port, or from any port 50 to the chamber 81 under the cap 70.

This type of construction just described has particular utility so that an excellent seal is obtained between the disc 40 and each of the ports 50. The particular advantages are best brought out by describing the assembly of the device for operation.

After each of the O rings is placed in its particular groove, they are suitably lubricated. This increases the life of each of the O rings and greatly reduces rotary friction. The disc-like member 40 or rotor is then put into place followed by the thrust bearing 64. The O ring 74 is then placed on the extension 42 and is also lubricated. The cap 70 is then put into place. However, the cap 70 is not tightened down with any large force. To obtain a proper adjustment of the cap 70 each of the ports 34 and their connectors 60 and the connector 76 leading from the passage 44 of the upper stem 42 are all manifolded together. The manifold is then charged with a slight pressure whose magnitude can be described as not sufficiently high to materially deform the O rings. By this it is meant that, as seen in FIG. 4, any pressure acting within the passage 36 will be of such magnitude and in the direction of the arrows such that it will not tend to deform the O ring 54. The nature of the assembled parts thus far is such that any leakage around the O rings 54 will tend to exit through the drilled passage 80 shown in FIGS. 2 and 4 in the left side of the cap 70. This passage 80 can be connected to a suitable leak detector. The cap 70 is then tightened until all leakage stops. The set screw 82 (FIG. 2) is then tightened to hold the cap 70 in position. The pressure of the manifold may now be increased considerably with no resulting leakage.

Now, the advantage of this construction becomes readily apparent. The cap 70 has been tightened to the least torque or pressure necessary to avoid leakage. Therefore, after prolonged idleness of the unit the O ring lubricant will not have been squeezed out so as to destroy any lubricant film; and, as a result, less friction exists so that exceptionally little power or torque is necessary to reposition the rotor or disc 40 when successive pressures are being sensed.

As best seen in FIG. 4, the principle of adjusting the cap 70 is such that only a slight pressure is applied by the rotor 40 to the top of the O rings 54. Any lubricant will tend to remain on the O rings on the contact faces. However, in operation, when the rotor or disc 40 is being snapped or indexed into progressively new positions and where pressure in the passage 36 increases, the face on the O rings increases such that no leakage ensues. In other words, as the pressure increases a greater force will be exerted on the O rings to hold them in positive contact with the lower portion of the rotor 40. Likewise, in the event that a vacuum is being sensed, the lack of pressure in the passage 38 will tend to draw the rotary 30 down firmly against the O ring 54 to the extent necessary to avoid leakage.

Another advantage of this type of construction is that the selector switch is backed only by the pressure of resistance of the O rings to deformation. In the prior art it has been the usual practice to spring-load one or other of the pressure selector elements so that loads thereon vary with spring rate and the usual leakage problems or sticking problems ensue.

In view of the foregoing, it will be apparent that a simple, yet highly efficient, leakage-proof and easily operable pressure or flow selector sensing and switching mechanism has been provided. Furthermore, the particular pressure sensing mechanism is adaptable to a number of systems not necessarily limited to the system illustrated in FIG. 1.

Although only one embodiment of this invention has been illustrated and described herein, it will be apparent that various changes and modifications may be made in the construction and the arrangement of the various parts without departing from the scope of this novel concept.

What it is desired by Letters Patent is:

1. A pressure selector switch having a main stationary body member, a plurality of inlet ports circumferentially disposed about said body and adapted to receive pressures from a plurality of sources, a stationary cap member forming a chamber with said body member, a rotary member in said chamber, said rotary member including a portion with a first flat face, a second flat face on one of said stationary members facing said first flat face, passage means in said stationary member having said second flat face connecting each of said ports to a separate opening in said second flat face, said separate openings being disposed on said second flat face in a circular row about the axis of rotation of the rotary member, circular grooves in said second flat face, each groove surrounding and being concentric with each of said plurality of openings, a resilient deformable seal being positioned in each of said grooves providing a seal between said first and second face around each opening, said seals projecting from the second flat face, said seals engaging the first flat face, said portion of said rotary member having said first flat face including a passage therein, one end of said passage being connected to an opening on said first flat face and being adapted to communicate with one of the said openings in said second flat face at a time, said stationary cap member having an outlet therein, the other end of said passage being in communication with the outlet in said cap member.

2. A pressure selector switch having a main stationary body member, a plurality of inlet ports circumferentially disposed about said body and adapted to receive pressures from a plurality of sources, a stationary cap member forming a chamber with said body member, a rotary member in said chamber, said rotary member including a portion with a first flat face, a second flat face on one of said stationary members facing said first flat face, a thrust bearing member between the other of said stationary members and said rotary member providing for relative movement therebetween, passage means in said stationary member having said second flat face connecting each of said ports to a separate opening in said second flat face, said separate openings being disposed on said second flat face in a circular row about the axis of rotation of the rotary member, circular grooves in said second flat face, each groove surrounding and being concentric with each of said plurality of openings, a resilient deformable seal being positioned in each of said grooves providing a seal between said first and second face around each opening, said seals projecting from the second flat face, said seals engaging the first flat face, said portion of said rotary member having said first flat face including a passage therein, one end of said passage being connected to an opening on said first flat face and being adapted to communicate with one of the said openings in said second flat face at a time, said stationary cap member having an outlet therein, the other end of said passage being in communication with the outlet in said cap member.

3. A pressure selector switch having a main stationary body member, a plurality of inlet ports circumferentially disposed about said body and adapted to receive pressures from a plurality of sources, a stationary cap member forming a chamber with said body member, a rotary member in said chamber, said rotary member including a portion with a first flat face, a second flat face on one of said stationary members facing said first flat face, passage means in said stationary member having said second flat face connecting each of said ports to a separate opening in said second flat face, said separate openings being disposed on said second flat face in a circular row about the axis of rotation of the rotary member, circular grooves in said second flat face, each groove surrounding and being concentric with each of said plurality of openings, a resilient deformable seal being positioned in each of said grooves providing a seal between said first and second face around each opening, said seals projecting from the second flat face, said seals engaging the first flat face, said portion of said rotary member having said first flat face including a passage therein, one end of said passage being connected to an opening on said first flat face and being adapted to communicate with one of the said openings in said second flat face at a time, said stationary cap member having an outlet therein, the other end of said passage being in communication with the outlet in said cap member, means for rotating said rotary member in one direction, means for indexing said rotary member so that each of said openings in said second flat face is placed in momentary connection with the opening on said first flat face connected to the passage of the portion of said rotary member having said first flat face, said chamber having an opening which connects it to a predetermined source of pressure, said passage communicating with said chamber when the one end which is adapted to communicate with one of said openings in said second flat face is between the respective seals of two adjacent openings thereby being connected to the pressure in said chamber.

4. A pressure selector switch having a main stationary body member, a plurality of inlet ports circumferentially disposed about said body and adapted to receive pressures from a plurality of sources, a stationary cap member forming a chamber with said body member, a rotary member in said chamber, said rotary member including a portion with a first flat face, a second flat face on one of said stationary members facing said first flat face, a thrust bearing member between the other of said stationary members and said rotary member providing for relative movement therebetween, passage means in said stationary member having said second flat face connecting each of said ports to a separate opening in said second flat face, said separate openings being disposed on said second flat face in a circular row about the axis of rotation of the rotary member, circular grooves in said second flat face, each groove surrounding and being concentric with each of said plurality of openings, a resilient deformable seal being positioned in each of said grooves providing a seal between said first and second face around each opening, said seals projecting from the second flat face, said seals engaging the first flat face, said portion of said rotary member having said first flat face including a passage therein, one end of said passage being connected to an opening on said first flat face and being adapted to communicate with one of said openings in said second flat face at a time, said stationary cap member having an outlet therein, the other end of said passage being in communication with the outlet in said cap member, means for rotating said rotary member in one direction, means for indexing said rotary member so that each of said openings in said second flat face is placed in momentary connection with the opening on said first flat face connected to the passage of the portion of said rotary member having said first face, said chamber having an opening which connects it to a predetermined source of pressure, said passage communicating with said chamber when the one end which is adapted to communicate with one of said openings in said second flat face is between the respective seals of two adjacent openings thereby being connected to the pressure in said chamber.

5. In a pressure selector, a rotary member having a substantially flat face, a body part including a plurality of circumferentially disposed inlet ports for receiving a plurality of pressures, a cap part forming a chamber with said body part, said chamber receiving said rotary member, one of said parts having a plurality of passages terminating in openings adjacent said face, each of said openings being surrounded by a circular groove, resilient deformable ring seals in said grooves, a passage in said rotary member having one end forming an inlet adapted to selectively communicate with each one of said openings, the other end of said passage forming an outlet, means for indexing said rotary member and the one end of said passage with each of said openings, said indexing means providing rotation of said rotary member in a predetermined direction, said one end of said passage freely communicating with said chamber when passing from one of said openings to the next adjacent opening, means for clamping said cap part and body part together to apply a predetermined pressure on the ring seals to at least partially deform said seals and prevent leakage into said chamber and to form a sealed connection between each said opening and said passage when indexed, a vent in the chamber connected to a separate source of pressure, and passage means for connecting said outlet with the exterior of said cap.

6. In a pressure selector switch having a main body, said body including a substantially flat face, a plurality of ports circumferentially disposed about said body and adapted to receive pressures from a plurality of sources, passages in said body connected to said ports and terminating in a plurality of openings in said face, said openings being disposed in a circular row about the axis of said body, circular grooves in said face each respectively surrounding and being concentric with each one of said openings, resilient deformable O ring seals in said grooves, the inner diameter of said seals being slightly larger than the inner diameter of said grooves, a rotary member including a disc-like member engageable with said face, said disc-like member including a passage adapted to communicate with one of said openings in the varied rotary positions of said disc-like member, the cross section of said passage and said openings being of substantially the same size, means for indexing said member and passage with each of said openings, an outlet for said passage, a cap including means for adjusting the cap relative to said body and along the axis thereof, and surrounding said member to form a chamber, said cap being engageable with said member to urge the latter toward said face to initially only slightly distort said seals, a vent in the wall of said cap whereby the cap is adjusted until leaking of fluid past the valve and into the said chamber is no longer detected, said seals being deformed in said grooves to further prevent leakage when elevated pressures are sensed, and passage means sealed off from said chamber for connecting said outlet with the exterior of said cap.

References Cited in the file of this patent

UNITED STATES PATENTS

| | | |
|---|---|---|
| 767,115 | McCormick | Aug. 9, 1904 |
| 905,605 | Tarn | Dec. 1, 1908 |
| 928,588 | Cornish | July 20, 1909 |
| 963,470 | Du Pont | July 5, 1910 |
| 1,003,752 | Jenkins | Sept. 19, 1911 |
| 1,071,464 | Ross | Aug. 26, 1913 |
| 1,564,856 | Karlsen | Dec. 8, 1925 |
| 1,708,273 | Larsen | Apr. 9, 1929 |
| 1,734,074 | Carner | Nov. 5, 1929 |
| 2,487,194 | Snow | Nov. 8, 1949 |
| 2,700,984 | Gleasman | Feb. 1, 1955 |
| 2,838,292 | Bramming | June 10, 1958 |
| 2,870,785 | Lovett | Jan. 27, 1959 |

FOREIGN PATENTS

| | | |
|---|---|---|
| 407,729 | France | Jan. 6, 1910 |
| 320,271 | Italy | Aug. 13, 1934 |
| 1,086,863 | France | Aug. 18, 1954 |